(12) United States Patent
Beber et al.

(10) Patent No.: US 11,839,324 B2
(45) Date of Patent: Dec. 12, 2023

(54) TEA MAKING APPLIANCE WITH FILTER ASSEMBLY

(71) Applicant: WHIRLPOOL CORPORATION, Benton Harbor, MI (US)

(72) Inventors: Kevin J. Beber, Granger, IN (US); Nancy E. Chandrasekaran, St. Joseph, MI (US); Ben C. Shao, Clarendon Hills, IL (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 17/699,557

(22) Filed: Mar. 21, 2022

(65) Prior Publication Data

US 2022/0202230 A1  Jun. 30, 2022

Related U.S. Application Data

(63) Continuation of application No. 16/589,275, filed on Oct. 1, 2019, now Pat. No. 11,297,972, which is a continuation of application No. 15/229,416, filed on Aug. 5, 2016, now Pat. No. 10,517,419.

(60) Provisional application No. 62/205,867, filed on Aug. 17, 2015.

(51) Int. Cl.
*A47J 31/20* (2006.01)
*A47J 31/14* (2006.01)
*A47J 31/44* (2006.01)

(52) U.S. Cl.
CPC .............. *A47J 31/20* (2013.01); *A47J 31/14* (2013.01); *A47J 31/4403* (2013.01)

(58) Field of Classification Search
CPC ......... A47J 31/14; A47J 31/20; A47J 31/4403
USPC ........................................................... 99/317
See application file for complete search history.

(56) References Cited

U.S. PATENT DOCUMENTS

| 424,361 | A | 3/1890 | Shobe |
|---|---|---|---|
| 1,015,396 | A | 1/1912 | Parsons |
| 1,327,532 | A | 1/1920 | Duvall |
| 1,370,292 | A | 3/1921 | Daniels |
| 7,275,652 | B2 | 10/2007 | Morris et al. |

(Continued)

FOREIGN PATENT DOCUMENTS

| DE | 4038210 A1 | 6/1992 |
|---|---|---|
| EP | 2818084 A1 | 12/2014 |

(Continued)

*Primary Examiner* — Dana Ross
*Assistant Examiner* — Joseph W Iskra
(74) *Attorney, Agent, or Firm* — Price Heneveld LLP

(57) ABSTRACT

A tea maker includes a brewing unit which defines a vessel having an upper opening with a spout disposed thereon. A lid assembly is removeably received on the upper opening of the vessel and includes a steeping tube. The steeping tube extends downwardly from the lid assembly into the vessel when the lid assembly is received on the upper opening of the vessel. An articulating filter assembly is coupled to the lid assembly and includes a filter plate that is operable between an extended position and a retracted position. The filter plate is configured to contact an inner surface of the vessel when the filter plate is in the extended position. A biasing member is configured to bias the filter plate towards the extended position for filtering a brewed tea mixture as the mixture is poured through the upper opening of the vessel.

16 Claims, 9 Drawing Sheets

(56) References Cited

U.S. PATENT DOCUMENTS

| | | |
|---|---|---|
| 8,695,486 B2 | 4/2014 | Bodum |
| 2010/0270284 A1 | 10/2010 | Cohen et al. |
| 2011/0048240 A1* | 3/2011 | Siu .......................... A47J 31/18 99/285 |

FOREIGN PATENT DOCUMENTS

| | | | |
|---|---|---|---|
| GB | 2279233 | A | 1/1995 |
| GB | 2302498 | * | 1/1997 |
| GB | 2302498 | A | 1/1997 |
| GB | 2459713 | * | 11/2009 |
| GB | 2459713 | A | 11/2009 |

* cited by examiner

TEA MAKING APPLIANCE WITH FILTER ASSEMBLY

CROSS REFERENCE TO RELATED APPLICATION

This application is a continuation of U.S. patent application Ser. No. 16/589,275 filed on Oct. 1, 2019, now U.S. Pat. No. 11,297,972, entitled "TEA MAKING APPLIANCE WITH FILTER ASSEMBLY", which claims priority to U.S. Pat. No. 10,517,419, filed on Aug. 5, 2016, entitled "TEA MAKING APPLIANCE WITH FILTER ASSEMBLY", which claims priority to and the benefit under 35 U.S.C. § 119(e) of U.S. Provisional Application No. 62/205,867 entitled "TEA MAKING APPLIANCE WITH FILTER ASSEMBLY" filed on Aug. 17, 2015, the entire contents of which are incorporated by reference.

FIELD OF THE INVENTION

The present concept generally relates to a tea maker, and more particularly, to a tea maker having a spring-loaded filter assembly.

SUMMARY

One aspect of the present concept includes a tea maker having a brewing unit. The brewing unit defines a vessel having an upper opening with a spout disposed thereon. A lid assembly is removeably received on the upper opening of the vessel and includes a central aperture opening into a steeping tube. The steeping tube extends downwardly from the lid assembly into the vessel when the lid assembly is received on the upper opening of the vessel. An articulating filter assembly is coupled to the lid assembly and includes a filter plate that is operable between an extended position and a retracted position. The filter plate is configured to contact an inner surface of the vessel when the filter plate is in the extended position. A biasing member is disposed on the filter assembly and is configured to bias the filter plate towards the extended position against the inner surface of the vessel for filtering a brewed tea mixture as the mixture is poured through the upper opening of the vessel.

Another aspect of the present concept includes a tea maker having a brewing unit with a vessel. The vessel includes an upper opening with a spout disposed thereon. A lid assembly is removeably received on the upper opening of the vessel. An articulating filter assembly is coupled to the lid assembly and includes a filter plate that is operable between extended and retracted positions. The filter plate is configured to contact an inner surface of the vessel when the filter plate is in the extended position. A biasing member is disposed on the filter assembly and configured to bias the filter plate towards the extended position.

Another aspect of the present concept includes a tea maker having a vessel with an inner surface that defines a cavity. The vessel further includes an upper opening with a spout disposed thereon. A lid assembly is removeably received on the upper opening of the vessel. A filter assembly is operably coupled to the lid assembly and includes a filter plate that is operable between extended and retracted positions. The filter plate is configured to contact the inner surface of the vessel when the filter plate is in the extended position.

Yet, another aspect of the present concept includes a tea maker having a vessel with a cavity and an upper opening. A spout is disposed on the upper opening. A lid assembly is removeably received on the upper opening of the vessel. A filter assembly is operably coupled to the lid assembly and includes a filter plate that is operable between extended and retracted positions relative to the vessel. The filter plate contacts an inner surface of the vessel when the filter plate is in the extended position. The vessel further includes a pouring path defined between the cavity of the vessel and the spout. The filter plate intersects the pouring path when the filter plate is in the extended position.

These and other features, advantages, and objects of the present device will be further understood and appreciated by those skilled in the art upon studying the following specification, claims, and appended drawings.

DETAILED DESCRIPTION OF EMBODIMENTS

Figure 1A:
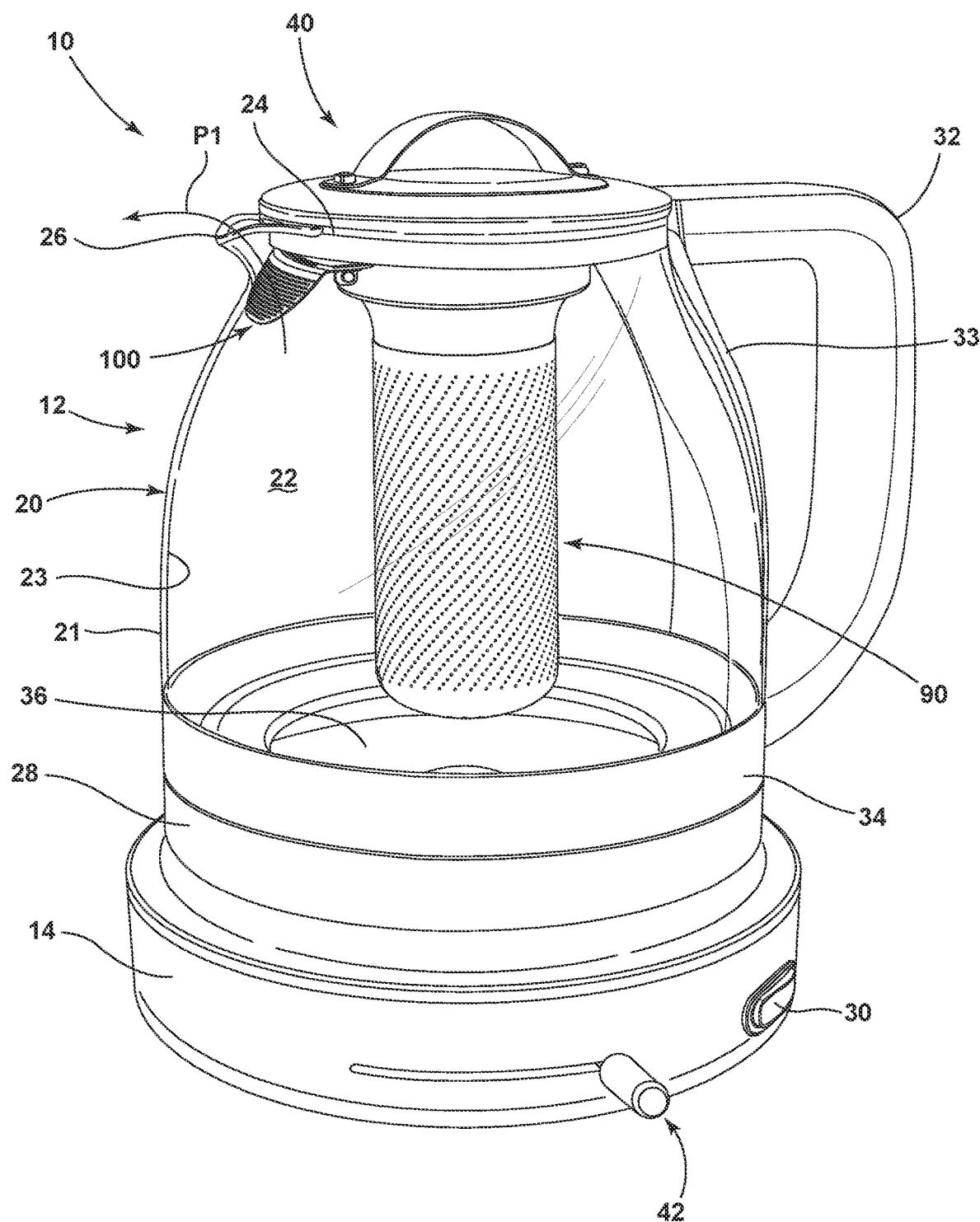
FIG. 1A is a perspective view of a tea maker having a kettle positioned on a support stand according to an embodiment of the present concept.

For purposes of description herein the terms "upper," "lower," "right," "left," "rear," "front," "vertical," "horizontal," and derivatives thereof shall relate to the device as oriented in FIG. 1A. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1A, the reference numeral 10 generally designates a tea making appliance, hereinafter tea maker, according to one embodiment of the present concept. As shown in FIG. 1A, the tea maker 10 includes a brewing unit 12 in the form of a glass kettle disposed on a support stand 14. The brewing unit 12 generally includes a vessel 20 which defines a cavity 22 for holding water and/or brewed tea in use. The brewing unit 12 includes an upper opening 24 having a spout 26 disposed thereon. The brewing unit 12 further includes a base portion 28 which is received on support stand 14. The base portion 28 houses a heating element which is configured to heat the contents of the brewing unit 12 when triggered by an actuation button 30 disposed on the support stand 14 which is operable between ON and OFF conditions. Thus, the base portion 28 is electrically coupled to the support stand 14 for powering the heating element of the base portion 28. As further shown in FIG. 1A, the brewing unit 12 further includes an outwardly extending handle 32 coupled to the vessel 20 which is engaged by a user for positioning the brewing unit 12 on the support stand 14, as well as for handling the brewing unit 12 when pouring brewed tea from the vessel 20 along a pouring path indicated by arrow P1. The pouring path P1 is defined between the cavity 22 of the vessel 20 and the spout 26 and serves to channel the contents of the vessel 20 to the spout 26 for exiting the vessel 20. A heat guard 33 is disposed on an outer surface 21 of the vessel 20, which is contemplated to shield a user's hand from the heated brewing vessel 20 as the user engages the handle 32. In the embodiment shown in FIG. 1A, the brewing unit 12 further includes a brushed metal trim band 34 which is generally disposed around the vessel 20 near the base portion 28. The brewing unit 12 further includes a bottom wall 36 which defines a heat transfer plate for heating water disposed in the vessel 20 during a tea brewing procedure. The vessel 20 is contemplated to be made from a substantially clear material, such as glass or any other like material, which is configured to withstand an operating temperature generally associated with brewing tea.

A lid assembly 40 is received on the upper opening 24 for selectively providing access to the cavity 22. The lid assembly 40 may be twist-locked into place on opening 24, or may be friction fit to the upper opening 24 by a flexibly resilient ring seal, as further described below. The lid assembly 40 can also be drop-set into place on upper opening 24. Once the lid assembly 40 is in place on the upper opening 24, the cavity 22 of the brewing unit 12 is considered to be substantially sealed. The lid assembly 40 is coupled to a steeping tube 90 which is disposed in the cavity 22 of the brewing unit 12 when the lid assembly 40 is in place on upper opening 24 of the vessel 20, as further described below.

Figure 1B:
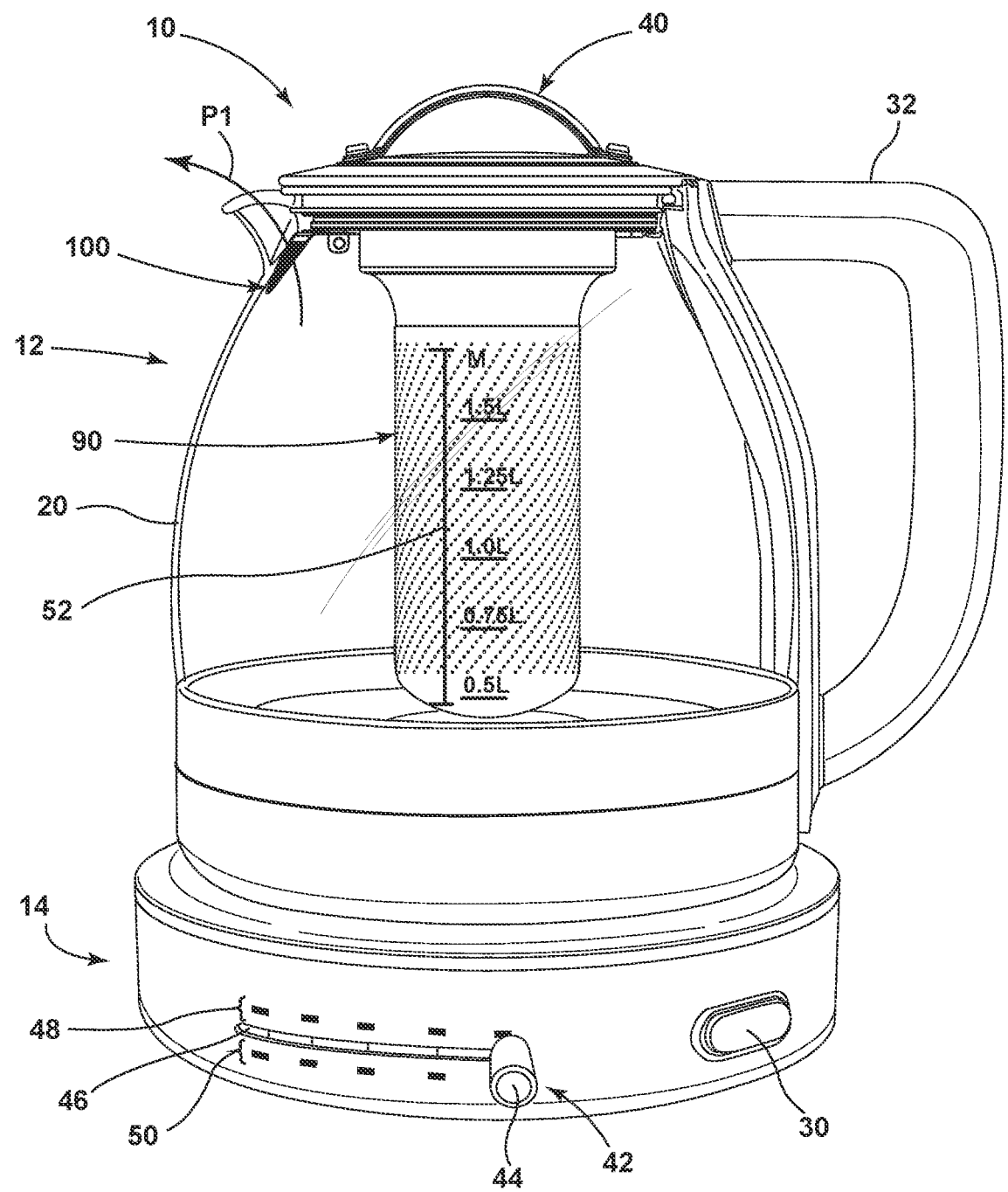
FIG. 1B is a side elevational view of the tea maker of FIG. 1.

Referring now to FIG. 1B, the support stand 14 includes a slide switch 42 having a selector handle 44 slideably disposed along a channel 46. As shown in FIG. 1B, various brewing functions 48 are disposed on an outer wall 15 of the support stand 14 above the channel 46. The brewing functions 48 can be selected by a user by sliding the selector handle 44 to a particular function. Further, a user can select a specific temperature for a brewing procedure by sliding the selector handle 44 along channel 46 to a particular temperature setting as found on a temperature scale 50 disposed on the outer wall 15 of the support stand 14 below the channel 46. In the embodiment shown in FIG. 1B, the brewing functions 48 may include the following functions: HERBAL, BLACK, OOLONG, WHITE, GREEN and DELICATE. The functions noted above are exemplary only and it is contemplated that other types of tea may be added or deleted from the list of brewing functions 48 of the tea maker 10. As further shown in FIG. 1B, the outer surface 21 of the vessel 20 includes a number of measurement markings 52 disposed thereon. The measurement markings 52 are used to indicate a specific volume of liquid received in the cavity 22 of the brewing unit 12.

Figure 2:
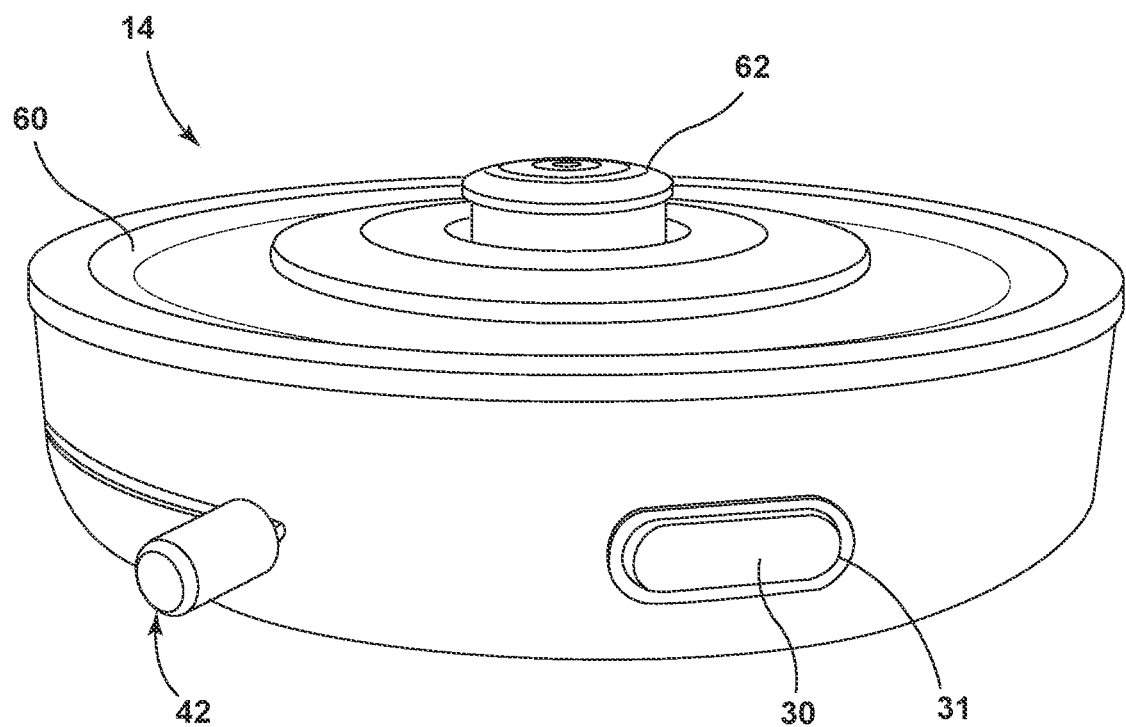
FIG. 2 is a top perspective view of the support stand a FIG. 1.

Referring now to FIG. 2, the support stand 14 is shown having the brewing unit 12 removed therefrom. With the brewing unit 12 removed, a support surface 60 is revealed having a centrally disposed upwardly extending power plug 62 disposed thereon. The power plug 62 is used to electronically couple the support stand 14 with the base portion 28 of the brewing unit 12, as further described below. It is contemplated that the support stand 14 further includes a power cord having a plug which is configured to connect the tea maker 10 (FIG. 1) to an electrical receptacle for powering the tea maker 10. As further shown in FIG. 2, the actuation button or power button 30 includes a lighting feature 31 disposed about a perimeter thereof. The lighting feature 31 is configured to light up when the unit is operating and may include different color LED lights to indicate different status conditions of the tea maker 10.

Figure 3:
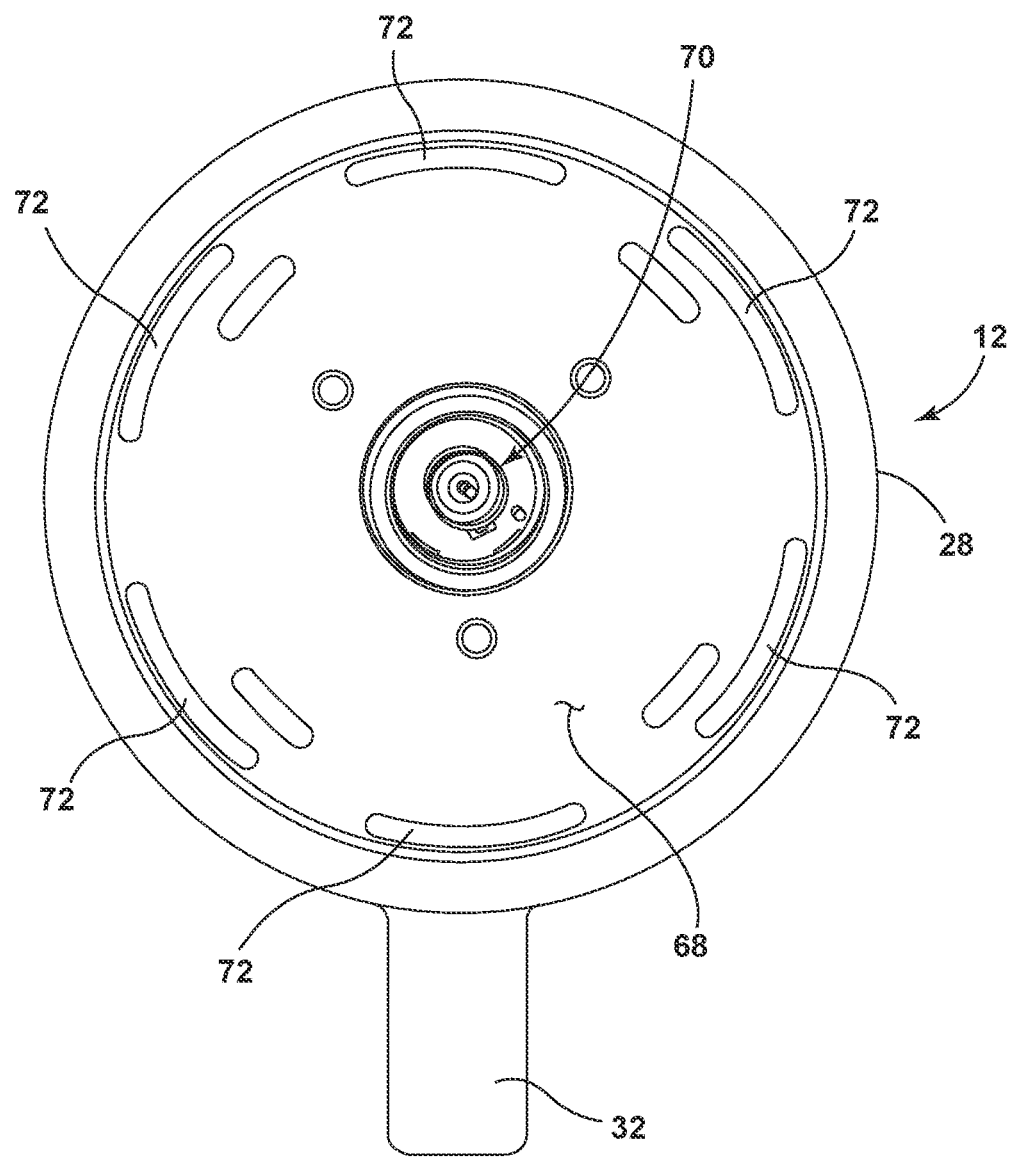
FIG. 3 is a bottom plan view of a base portion of the kettle of FIG. 1.

Referring now to FIG. 3, the base portion 28 of brewing unit 12 is shown having a bottom surface 68 with an inwardly extending and centrally disposed receptacle 70. In assembly, the upwardly extending power plug 62 disposed on support surface 60 of support stand 14 (FIG. 2) is configured to be vertically received in the receptacle 70 of the brewing unit 12. In this way, the brewing unit 12 is electrically coupled to and powered by the support stand 14. The brewing unit 12 is supported on the support stand 14 at an abutment of bottom surface 68 of the brewing unit 12 and support surface 60 (FIG. 2) of the support stand 14. The bottom surface 68 of brewing unit 12 further includes a plurality of stand-off features or feet 72 disposed around a perimeter thereof. The feet 72 can be molded-in structures or rubberized structures adhered to the bottom surface 68 for providing grip to the abutment of bottom surface 68 of the brewing unit 12 and the support surface 60 of the support stand 14, as well as providing grip to any surface on which the brewing unit 12 may be disposed when removed from the support stand 14.

Figure 4A:
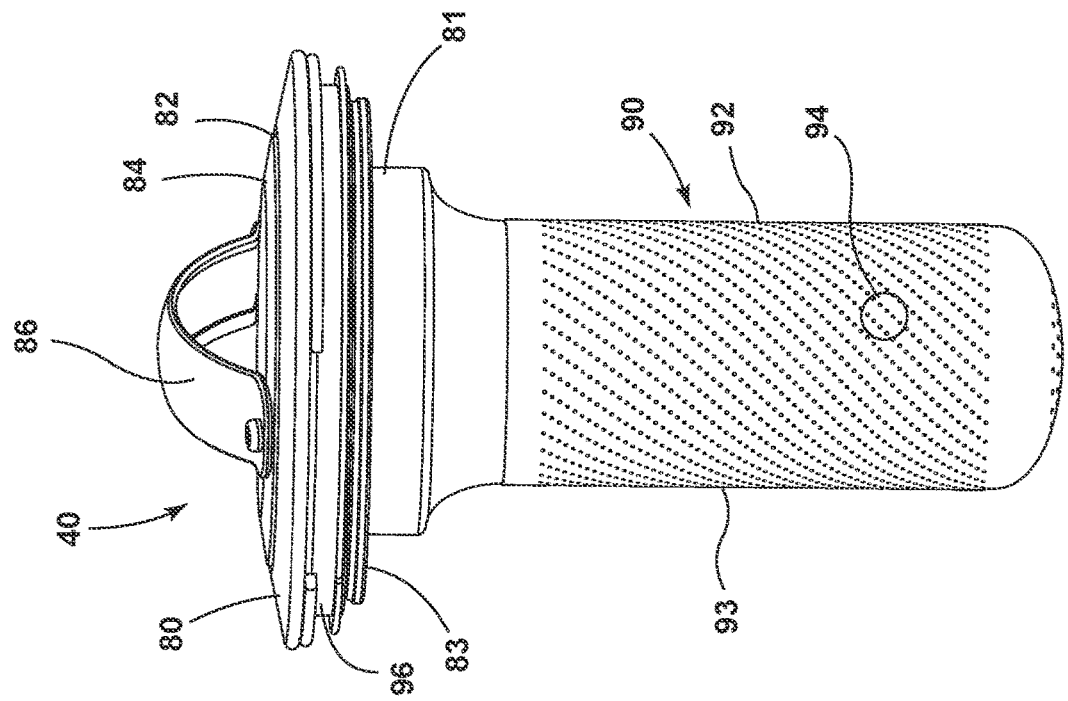
FIG. 4A is a top perspective view of a lid and steeper assembly as removed from the tea maker of FIG. 1.
Figure 4B:
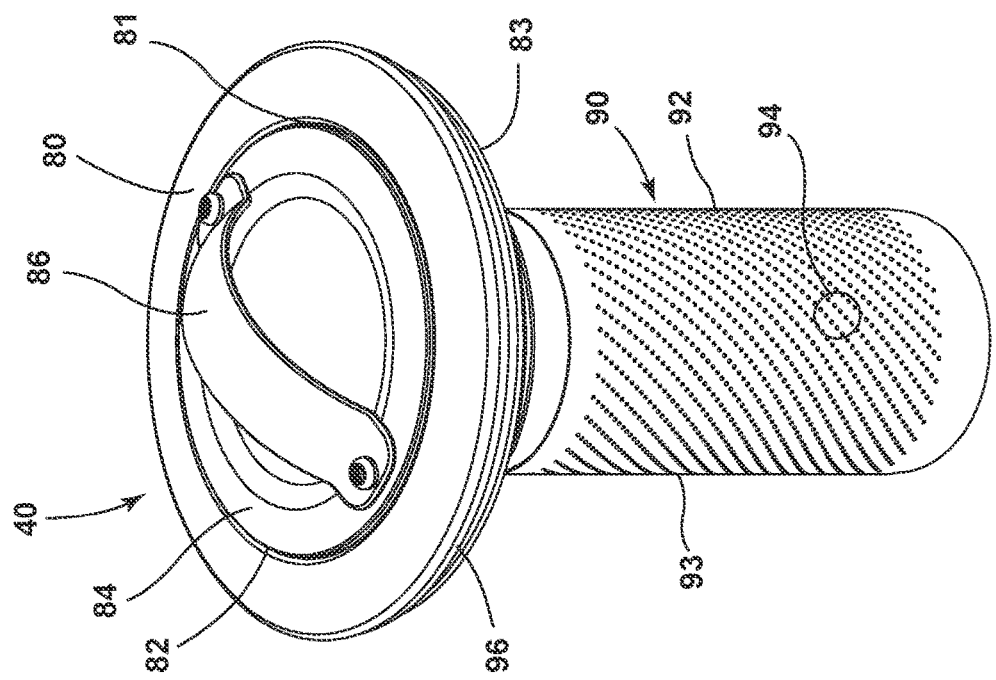
FIG. 4B side elevational view of the lid and steeper assembly of FIG. 4A.

Referring now to FIGS. 4A and 4B, the lid assembly 40 is shown having an outer rim portion 80 and an inner portion 81 surrounding a centrally disposed aperture 82. The entire lid assembly 40 can be removed from the brewing unit 12, or the inner portion 81 can be removed from the outer rim portion 80, such that the outer rim portion 80 can remain on the brewing unit 12 without the inner portion 81 to cover the upper opening 24 during a water heating sequence. Thus, the inner portion 81 and outer portion 80 are removeably coupled to one another by any form of engagement, such as a twist-lock arrangement. The inner portion 81 further provides insulating features impeding heat transfer from the inner portion 81 to the outer portion 80, which further insulates the handle 32 of the vessel 20. A lid or cover 84 closes the aperture 82 and includes a cover handle 86. The cover 84 is configured to selectively close and lock into place on the aperture 82 of the lid assembly 40. The aperture 82 opens into a steeping tube 90 which is removeably coupled to the inner portion 81 as further described below. The steeping tube 90 generally includes a metal body portion 92 defined by an outer wall 93 having a plurality of perforations 94 disposed therethrough. In use, a user will remove the cover 84 to access aperture 82 for providing a select amount of tea to the steeping tube 90 in preparing for a brewing sequence. As noted above, the steeping tube 90 extends downwardly from the lid assembly 40, such that the steeping tube 90 is disposed within the cavity 22 of the brewing unit 12 when the lid assembly 40 is in place on the upper opening 24 of the brewing unit 12 (See FIG. 1A). A seal member 96 is disposed around an outer surface of the outer rim portion 80 of the lid assembly 40 and is configured to seal against the upper opening 24 of the brewing unit 12 when the lid assembly 40 is in place on the brewing unit 12.

The outer rim portion 80 further includes an underside 83 where a filter assembly is attached, as further described below.

Figure 5:
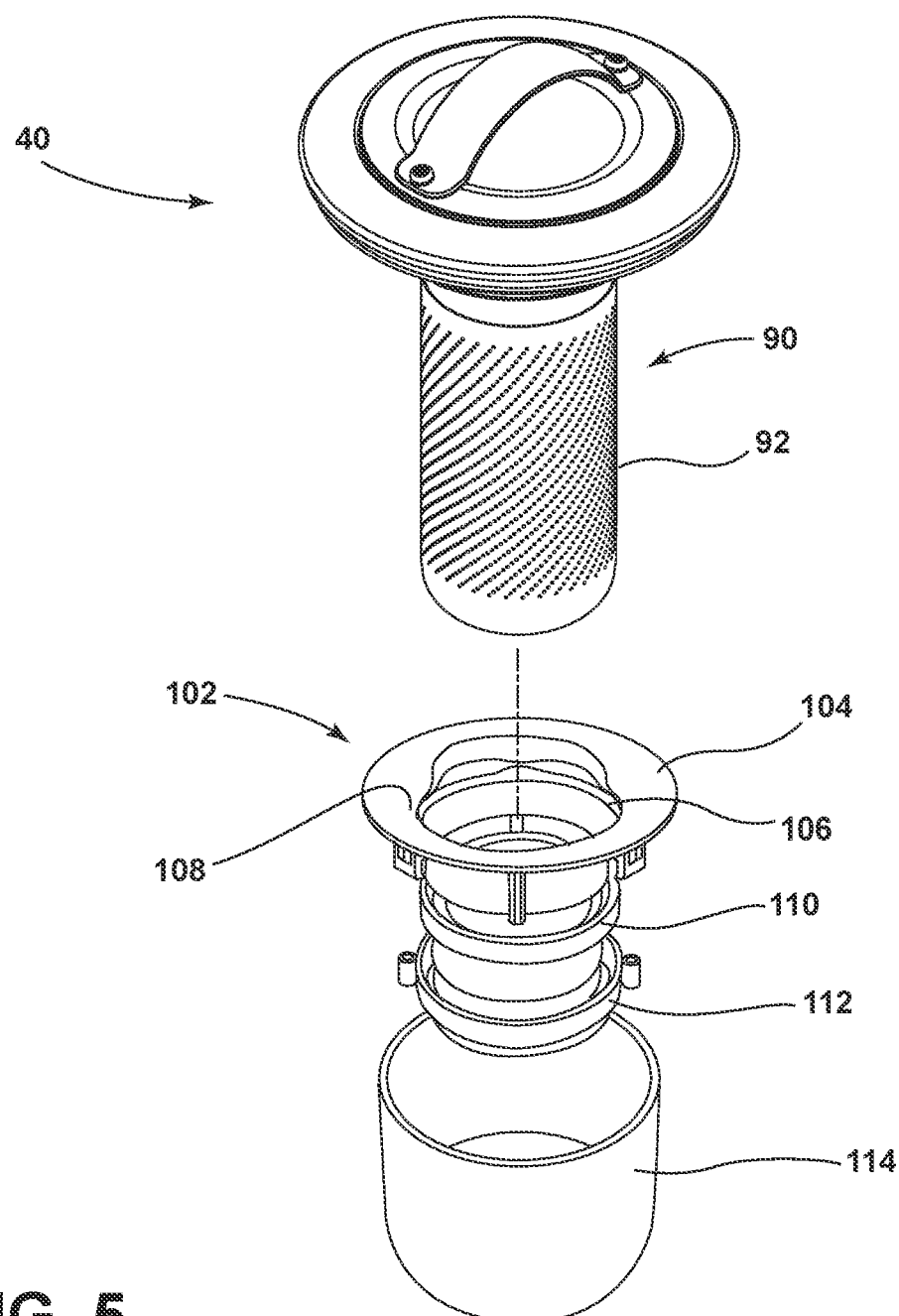
FIG. 5 is a top perspective view of the lid and steeper assembly of FIG. 4A as shown being received in a steeper holder unit shown in an exploded top perspective view.

In preparation for a brewing sequence, a user will generally remove the lid assembly 40 from the brewing unit 12 and add water to the cavity 22 of the vessel 20 to a desired level. The steeping tube 90 will be removed from the lid assembly 40 and the lid assembly 40 will be placed back on the brewing unit 12 at upper opening 24. The user will then set the parameters for a heating sequence by setting the slide switch 42 to a desired temperature or tea type. The user will then initiate the heating sequence by pushing the actuation button 30. Once the added water in the cavity 22 has reached a desired temperature, the user can remove the entire lid assembly 40, or remove the inner portion 81 of the lid assembly 40 alone, while leaving the outer rim portion 80 and cover 84 on the brewing unit 12 to retain the temperature of the heated water. A select amount of tea can be added to the steeping tube 90 while the steeping tub 90 is placed in a steeper holder 102, as further described below with reference to FIG. 5. The steeping tube 90, with the tea disposed therein for brewing, will then be coupled to the inner portion 81 of the lid assembly 40, as best shown in FIG. 8 and described below. Once the steeping tube 90 is attached to the lid assembly 40, it is removed from the steeper holder 102 (FIG. 5) and introduced through the outer rim portion 80, such that the steeping tube 90 is now inside the vessel 22 and the inner portion 81 is twist locked into a coupled arrangement with the outer rim portion 80 to form a single rigid lid assembly 40. The lid assembly 40 is kept in place with the inner portion 81 coupled to the outer portion 80 for the entire steeping time. At the end of the steeping time, either the entire lid assembly 40 can be removed, as shown in FIG. 5, or the inner portion 81 can be removed from the outer rim portion 80 via the twist lock. Removing the inner portion 81, also removes the steeping tube 90 and tea leaves from the outer rim portion 80, which can stay with the vessel 22. The inner lid portion 81 and steeping tube 90 can again be placed in the steeper holder 102 (FIG. 5) for cooling. The user is now ready to serve the tea without the potential for oversteeping. It is contemplated that the tea will steep in the steeping tube 90 for an amount of time desired by the user to provide a brewed tea beverage in the cavity 22. After the steeping tube 90 is removed, the inner portion 81 of the lid assembly 40 is re-attached to the outer rim portion 80 of the lid assembly 40 that is still with the vessel 22 via a twist lock. The brewed tea beverage can be poured from the vessel 20 through the lid assembly 40 at spout 26 disposed on the upper opening 24. The brewed tea beverage may include particulate in the mixture, such as tea particles that may have escaped the steeping tube 90 through the perforations 94. Further, lime scale deposits created during a brewing procedure may also be in the mixture of brewed tea. For this reason, the tea maker 10 of the present concept includes a spring-loaded articulating filter assembly 100 (FIGS. 1A and 1B) for filtering the contents of the brewed tea mixture as the brewed tea mixture exits the vessel 20 along a pouring path indicated by arrow P1 (FIGS. 1A, 1B). The filter assembly 100 is further described below with specific reference to FIGS. 6-8.

During a brewing procedure, the steeping tube 90, being disposed in heated water, is itself heated to a notable degree given a metal body portion 92 of the steeping tube 90. Thus, when the steeping tube 90 is removed with the lid assembly 40, it is best to keep the lid assembly 40 in an upright position in a proper holding assembly. Referring now to FIG. 5, a steeper holder unit 102 is shown in an exploded view having a top portion 104 with a centrally disposed aperture 106. The central aperture 106 includes a rounded rim 108 for ease in receiving the body portion 92 of the steeping tube 90 of the lid assembly 40. The steeper holder unit 102 further includes a polymeric member 110 which may be comprised of a silicone material. The silicone material of the polymeric member 110 provides a gripping feature for holding the steeping tube 90 in place while the inner portion 81 of the lid assembly 40 is removed via twist lock engagement. Thus, the steeping tube 90 can be press fit into a frictional engagement with the polymeric member 110 for stable placement of the same. As further shown in FIG. 5, the steeper holder unit 102 further includes an inner steeper holder 112 and an outer housing 114, wherein the outer housing 114 is configured to receive the components of the steeper holder 102 when the steeper holder 102 is in an assembled condition. As shown in FIG. 5, the steeper holder 102 is configured to receive the steeping tube 90 through the central aperture 106 when the lid assembly 40 is removed after a brewing sequence. The steeper holder 102 is an insulated member that can be utilized by the consumer to hold the heated steeping tube 90 until the steeping tube 90 has sufficiently cooled. Once the steeping tube 90 has cooled, the user can remove the lid assembly 40 and steeping tube 90 from the steeper holder 102 for cleaning and removal of the used tea from the steeping tube 90.

Figure 6:
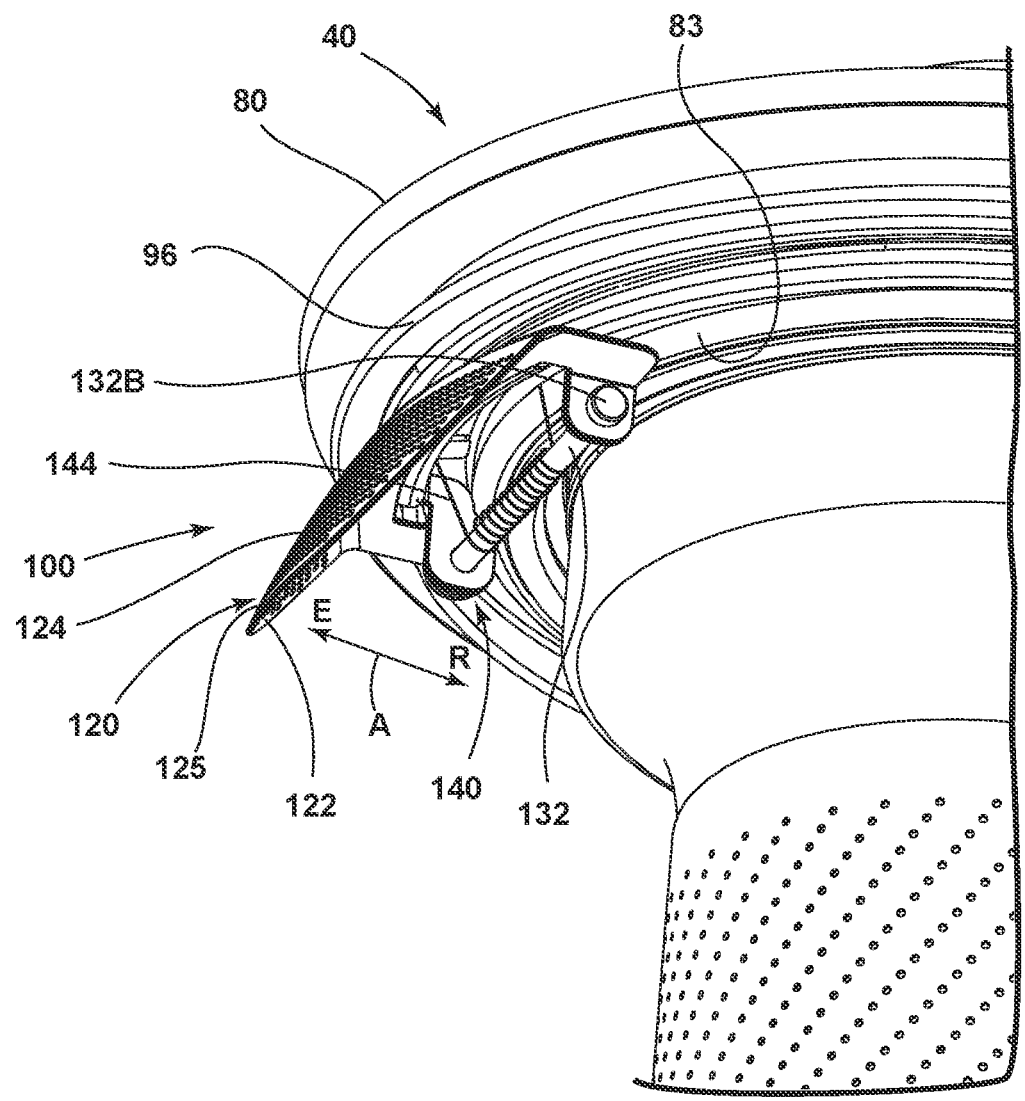
FIG. 6 is a bottom perspective view of the of the lid and steeper assembly of FIG. 4A.

Referring now to FIG. 6, the lid assembly 40 is shown having the filter assembly 100 disposed under the seal member 96. The filter assembly 100 includes a filter plate 120 having a body portion 122 with a plurality of perforations 124 disposed therethrough. The body portion 122 of the filter plate 120 is curved in a manner so as to abut a similarly curved inner surface 23 of the vessel 20 at an outer edge 125 in a manner as shown in FIG. 1A. As shown in FIG. 1A, the inner surface 23 of the vessel 20 includes a curved contour, and the body portion 122 of the filter plate 120 includes a curved configuration that is complimentary to the curved contour of the inner surface 23 of the vessel 20 for close engagement therebetween. As positioned against the inner surface 23 of the vessel 20, the filter plate 120 is configured to filter particulate that may be disposed in a brewed tea mixture as the brewed tea exits the vessel 20 through the filter plate 120 along the path as indicated by arrow P1 (FIG. 1A). This is due to the location of the filter plate 120 being transversely disposed across the pouring path P1, wherein the pouring path P1 is defined from the cavity 22 of the vessel 20 to the spout 26 disposed on the upper opening 24 of the vessel 20. Thus, the filter plate 120 is configured to be situated in a perpendicular manner relative to the pouring path P1 for filtering the contents of the vessel 20 being poured out of the vessel 20 along the pouring path P1. In this way, the filter plate 120 intersects the pouring path P1 when the filter plate 120 is in the extended position E. The lid assembly 40 is configured to properly align the filter plate 120 of the filter assembly 100 along the pouring path P1 adjacent the spout 26 of the vessel 20. In order to properly locate the filter assembly 100 in a position adjacent the spout 26 of the vessel 20, the lid assembly 40 includes one or more locating features as shown and described below with reference to FIG. 8. The locating features may be configured to interact with a portion of the handle 32 or with a receiving feature disposed on the vessel 20 to ensure that the lid assembly 40 is properly received on the upper opening 24 of the vessel 20 in use.

Referring again to FIG. 6, the filter plate 120 is a spring-loaded articulating metal mesh which is operable between an extended position E and a retracted position R along a path as indicated by arrow A. In this way, the filter plate 120 is pivotally coupled to the lid assembly 40 and biased towards the extended position E by a biasing member 140, as further described below. With the filter plate 120 biased towards the extended position E, a proper fitting of the filter plate 120 against the inner surface 23 of the vessel 20 is ensured by constant force provided by the biasing member 140 to keep the filter plate 120 engaged with the inner surface 23 of the vessel 20.

Figure 7:
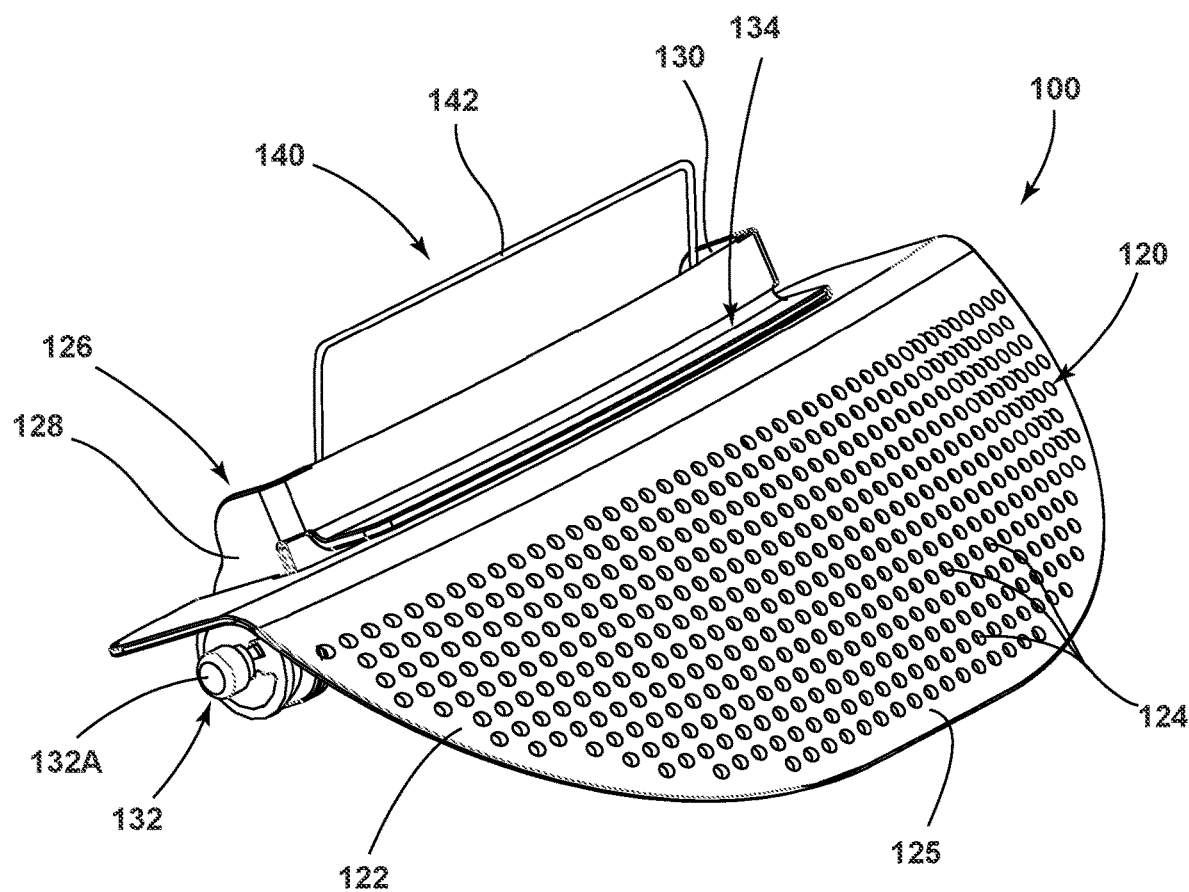
FIG. 7 is a top perspective view of a spring-loaded filter assembly.
Figure 8:
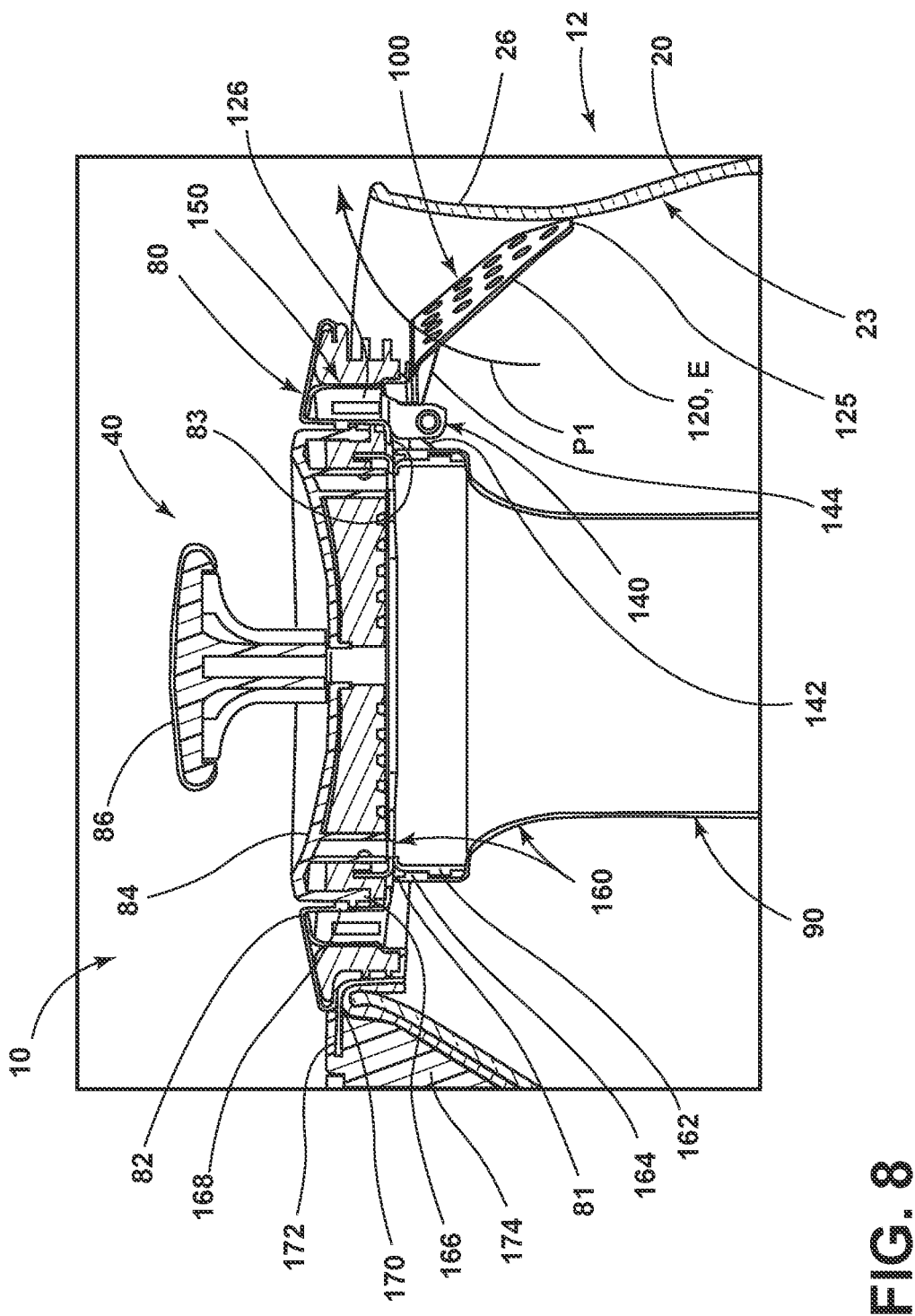
FIG. 8 is a cross-sectional view of the lid and steeper assembly of FIG. 6 taken at line VIII.

Referring now to FIG. 7, the filter assembly 100 is shown and is contemplated to be an all metal one-piece unit. With the filter assembly 100 being an all metal unit, along with the metal of the steeping tube 90 and bottom wall 36 of the glass vessel 20, there is no plastic-to-tea contact for a brewed tea beverage during steeping or pouring along the pouring path P1. In this way, tea brewed using the tea maker 10 of the present concept is no subject to heated plastic parts for a more sterile tea brewing experience. The filter plate 120 generally defines a front portion of the filter assembly 100. The filter assembly 100 further includes a bracket portion 126 having first and second legs 128, 130 which are interconnected by a pivot bar 132 having first and second ends 132A (FIG. 7), 132B (FIG. 6). The bracket portion 126 and filter plate 120 are pivotally connected to one another at the pivot bar 132. The biasing member 140 is shown in FIG. 7 in the form of a coil spring. The biasing member 140 includes a first leg 142 (FIG. 7) that is configured to act against an outer surface of the lid assembly 40, and a second leg 144 (FIG. 6) configured to abut and act against an inner surface of the filter plate 120. In use, the coil spring 140 is configured to bias the filter plate 120 towards the extended position E as shown in FIGS. 1A and 6, thereby providing consistent engagement between the filter plate 120 and the inner surface 23 of the vessel 20.

Referring now to FIG. 8, the filter plate 120 is shown in the extended position E, wherein the outer edge portion 125 of the filter plate 120 is in contact with the inner surface 23 of the vessel 20. In this way, brewed tea passing through the filter plate 120 via perforations 124 is filtered as the brewed tea exits the vessel 20 at the spout 26 along pouring path P1. The bracket portion 126 of the filter assembly 100 is shown coupled to an inner channel 150 disposed on the underside 83 of the outer rim portion 80 of the lid assembly 40. The bracket portion 126 may be welded to the channel 150 of the lid assembly 40, or may be slidably received or otherwise coupled to the channel 150 in assembly. In FIG. 8, the biasing member 140 is shown having first leg 142 engaging filter plate 120 and second leg 144 engaging the lid assembly 40 for biasing the filter plate 120 to the extended position E.

As further shown in FIG. 8, the steeping tube 90 includes an upper portion 160 having locking features 162 configured to removeably lock the steeping tube 90 to the inner portion 81 of the lid assembly 40 at reciprocal locking features 164 disposed on the inner portion 81 of lid assembly 40. Similarly, the cover 84 of the lid assembly 40 is shown having locking features 166 configured to engage reciprocal locking features 168 disposed adjacent the central aperture 82 of the lid assembly 40. In this way, the cover 84 can be locked in place on the lid assembly 40 during a brewing sequence.

As further shown in FIG. 8, a locating feature 170 of the lid assembly 40 extends outwardly from the lid assembly 40 to engage a locating channel 172 disposed in an upper portion 174 of the handle 32 of the vessel 20. When the locating feature 170 is received in the locating channel 172 of the upper portion 174 of the handle 32 of the vessel 20, the filter plate 120 of the filter assembly 100 is aligned with the spout 26 of the vessel 20 along pouring path P1. In this way, the filter plate 120 is ensured to be in the proper position for filtering a brewed tea mixture as the brewed tea mixture exits the vessel 20 along the pouring path indicated by arrow P1. In FIG. 8, the proper position for the filter plate 120 is in an upstream location along the pouring path P1 relative to the spout 26. As used in this disclosure, the term "upstream" indicates that the filter plate 120 of the filter assembly 100 is disposed along the pouring path P1 in a location that is before the spout 26. This is because the pouring path P1 is a path of contents exiting the cavity 22 of the vessel 20 towards the spout 26. With the filter plate 120 disposed in an upstream location relative to the spout 26, the contents of the vessel 20 will be filtered by the filter plate 120 before reaching the spout 26. The locating feature 170 of the lid assembly 40 further acts as an anti-rotational feature for the lid assembly 40 when received in the locating channel 172 disposed on the upper portion 174 of the handle 32.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical, magnetic or mechanical) directly or indirectly to one another. Such joining may be stationary in nature or movable in nature. Such joining may be achieved with the two components (electrical, magnetic or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An appliance, comprising:
   a support stand having a support surface with a power plug extending upwardly from the support surface;
   a vessel removeably received on the support stand, wherein the vessel includes a cavity having an inner surface and an upper opening, and further wherein the vessel includes a bottom surface having a receptacle for receiving the power plug;
   a lid assembly removeably received on the upper opening of the vessel and having a centrally disposed aperture, wherein the lid assembly includes a filter plate pivotally coupled to an underside of the lid assembly and operable between extended and retracted positions, wherein the filter plate includes a body portion having a plurality of perforations disposed therethrough, and further wherein the body portion of the filter plate contacts the inner surface of the vessel when the filter plate is in the extended position; and
   a cover removable coupled to the lid assembly, wherein the cover is received over the centrally disposed aperture.

2. The appliance of claim 1, including:
   a biasing member operably coupled between the filter plate and the underside of the lid assembly, wherein the biasing member biases the filter plate towards the extended position.

3. The appliance of claim 2, wherein the biasing member includes a coil spring having a first leg coupled to the filter plate and a second leg coupled to the underside of the lid assembly.

4. The appliance of claim 1, including:
   a spout positioned on the upper opening of the cavity; and
   a pouring path defined between the cavity of the vessel and the spout, wherein the filter plate is disposed along the pouring path in a transverse direction relative to a direction of the pouring path when the filter plate is in the extended position.

5. The appliance of claim 4, wherein the filter plate is disposed along the pouring path in an upstream location relative to the spout.

6. The appliance of claim 1, wherein the inner surface of the vessel includes a curved contour.

7. The appliance of claim 6, wherein the body portion of the filter plate includes a curved configuration that is complimentary to the curved contour of the inner surface of the vessel.

8. A kettle, comprising:
   a vessel having a cavity and an upper opening; and
   a lid assembly removeably received on the upper opening of the vessel, wherein the lid assembly includes a filter plate operably coupled to an underside of the lid assembly and operable between extended and retracted positions, wherein the filter plate contacts an inner surface of the vessel when the filter plate is in the extended position, and further wherein the filter plate is removeably received in the cavity of the vessel, and further wherein the lid assembly includes a central aperture opening into a steeping tube extending downwardly from the lid assembly.

9. The kettle of claim 8, wherein the inner surface of the vessel includes a curved contour.

10. The kettle of claim 9, wherein the filter plate includes a body portion having a curved configuration that is complimentary to the curved contour of the inner surface of the vessel.

11. The kettle of claim 10, wherein the body portion of the filter plate includes a plurality of perforations disposed therethrough.

12. The kettle of claim 8, wherein the steeping tube extends into the cavity of the vessel when the lid assembly is received on the upper opening of the vessel.

13. The kettle of claim 8, including:
    a handle disposed on an outer surface of the vessel, wherein the handle includes an upper portion having a locating channel disposed thereon.

14. The kettle of claim 13, wherein the lid assembly includes a locating feature configured to be received in the locating channel of the handle.

15. The kettle of claim 8, including:
    a cover configured to selectively cover the central aperture of the lid assembly.

16. The kettle of claim 8, wherein the steeping tube includes a body portion having a plurality of perforations disposed therethrough.

* * * * *